United States Patent
Mizushima et al.

(10) Patent No.: US 8,270,816 B2
(45) Date of Patent: Sep. 18, 2012

(54) INFORMATION RECORDING AND/OR PLAYBACK APPARATUS

(75) Inventors: Toshiya Mizushima, Yokohama (JP);
Yuichi Katano, Yokohama (JP);
Yasunori Ohara, Yokohama (JP); Keiji Nagayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1324 days.

(21) Appl. No.: 11/867,078

(22) Filed: Oct. 4, 2007

(65) Prior Publication Data

US 2008/0131095 A1    Jun. 5, 2008

(30) Foreign Application Priority Data

Dec. 1, 2006  (JP) ................. 2006-325135

(51) Int. Cl.
*G11B 27/00* (2006.01)
*H04N 5/93* (2006.01)
*H04N 9/80* (2006.01)

(52) U.S. Cl. ........ 386/279; 386/278; 386/282; 386/239; 386/248; 386/257

(58) Field of Classification Search .............. 386/278, 386/279, 282, 239, 248, 257
See application file for complete search history.

(56) References Cited

U.S. PATENT DOCUMENTS

2005/0265169 A1*  12/2005  Yoshimaru et al. ........ 369/47.12

FOREIGN PATENT DOCUMENTS

| JP | 11-066821 | 3/1999 |
|---|---|---|
| JP | 2002-100168 | 4/2002 |
| JP | 2002-176618 | 6/2002 |
| JP | 2004-127470 | 4/2004 |
| JP | 2005-149633 | 6/2005 |
| JP | 2005-175616 | 6/2005 |
| JP | 2005-318186 | 11/2005 |
| JP | 2005-347822 | 12/2005 |
| JP | 2006-033653 | 2/2006 |
| JP | 2006-080890 | 3/2006 |
| JP | 2006-173950 | 6/2006 |

* cited by examiner

*Primary Examiner* — Daquan Zhao
(74) *Attorney, Agent, or Firm* — Antonelli, Terry, Stout & Kraus, LLP.

(57) ABSTRACT

To provide an information recording and/or playback apparatus for dubbing onto a second recording medium all or some of plural pieces of information from a first recording medium in which the plural pieces of information are recorded. The apparatus includes a dubbing function that includes a plurality of dubbing functions respectively having different dubbing information selection methods. In the event of executing dubbing, identifiers enabling selection of one of the plurality of dubbing functions and a display screen for displaying an explanatory text regarding the respective dubbing function is displayed. In addition, when information is selected before the display screen is displayed, the information selection method of the respective dubbing function and an explanatory text to be displayed is changed corresponding to an information selection state.

6 Claims, 18 Drawing Sheets (a)

(b)

(All programs) + (All)

(Program) + (All)

(Play list) + (All)

(All programs) + (Select)

(Program) + (Select)

(Play list) + (Select)

(All programs) + (Date)

(Program) + (Date)

(Play list) + (Date)

| Dubbing Mode Selection |
|---|
| All    Un-dubbed |
| Select    Date |
| Dubbing of scenes of the selected date in the play list will be executed. |

(All programs) + (Un-dubbed)

(Program) + (Un-dubbed)

(Play list) + (Un-dubbed)

INFORMATION RECORDING AND/OR PLAYBACK APPARATUS

PRIORITY CLAIM/INCORPORATION BY REFERENCE

The present application claims priority from Japanese patent application No. P2006-325135 filed 1 Dec. 2006, the entire contents of the above application(s) hereby being incorporated by reference into this application.

TECHNICAL FIELD

The present invention relates to an information recording and/or playback apparatus.

BACKGROUND ART

As one technique in the present technical field, one example is described in Patent Document 1 (Japanese Unexamined Patent Application Publication No. 2005-318186). According to the publication (refer to the Patent Abstract), a problem to be solved is "a video image recording apparatus capable of dubbing a desired scene of a video image in a video reproducing apparatus without the need for troublesome operations." As a solution to the above-described problem, there is described to an effect that "A window W1 for displaying a video image, HDD operation keys X2 to X4 for controlling the recording of the video image in an HDD recorder to an HDD, and DV operation keys Y1 to Y5 for controlling reproduction of the video image of a DV camcorder connected to the HDD recorder via an IEEE 1394 interface are provided on a dubbing image G2 displayed on a connected television monitor. When the DV operation keys Y1 to Y5 are operated by a remote controller of the HDD recorder, a control signal is transmitted to the DV camcorder to control the reproduction of the DV camcorder. When the video image reproduced from the DV camcorder is input, the HDD recorder displays the video image on the window W1, and when the remote controller operates the video recording key X4 in this state, the HDD recorder dubs the video input image to the HDD."

Another example is described in Patent Document 2 (Japanese Unexamined Patent Application Publication No. 2006-80890 (refer to the Patent Abstract)). The problem to be solved is "to dub desired video audio information in a disk without increasing a time and labor for searching even if the number of pieces of video audio information recorded in an HDD is large." As a solution to the above-described problem, there is described an effect that "a configuration includes a dubbing control means 12 for dubbing video audio information recorded on an apparatus-side recording medium 3 on an extractable recording medium 17 via a recording medium drive section 2; and a retrieval display means 11 for retrieving video audio information corresponding to an inputted retrieval condition by referring reference information made to correspond to the video audio information. The retrieval means 11 receives the input of the retrieval condition, retrieves video audio information corresponding to the input retrieval condition, and sets it as a dubbing object; and the dubbing means 12 dubs the video audio information set as the dubbing object by the retrieval means 11 in the recording medium 17."

Another example is described in Patent Document 3 (Japanese Unexamined Patent Application Publication No. 2005-175616 (refer to the Patent Abstract)). The problem to be solved, which is described therein, is "to display a menu with ease of use by an elderly person and a user unskilled in operation." As a solution to the above-described problem, there is described to an effect that "a user can select a first menu for displaying a prescribed number of functions by a plurality of layers and a second menu for displaying a prescribed number of functions less than the number of functions in the first menu with a single layer. When displaying the second menu, items of the functions in accordance with the second menu are displayed on one screen through a single layer configuration."

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. In the drawings, same or corresponding portions may be referenced by the same or similar reference numerals in order to eliminate redundant explanation.

The following represents brief descriptions of the drawings, wherein.

DETAILED DESCRIPTION

Figure 1:
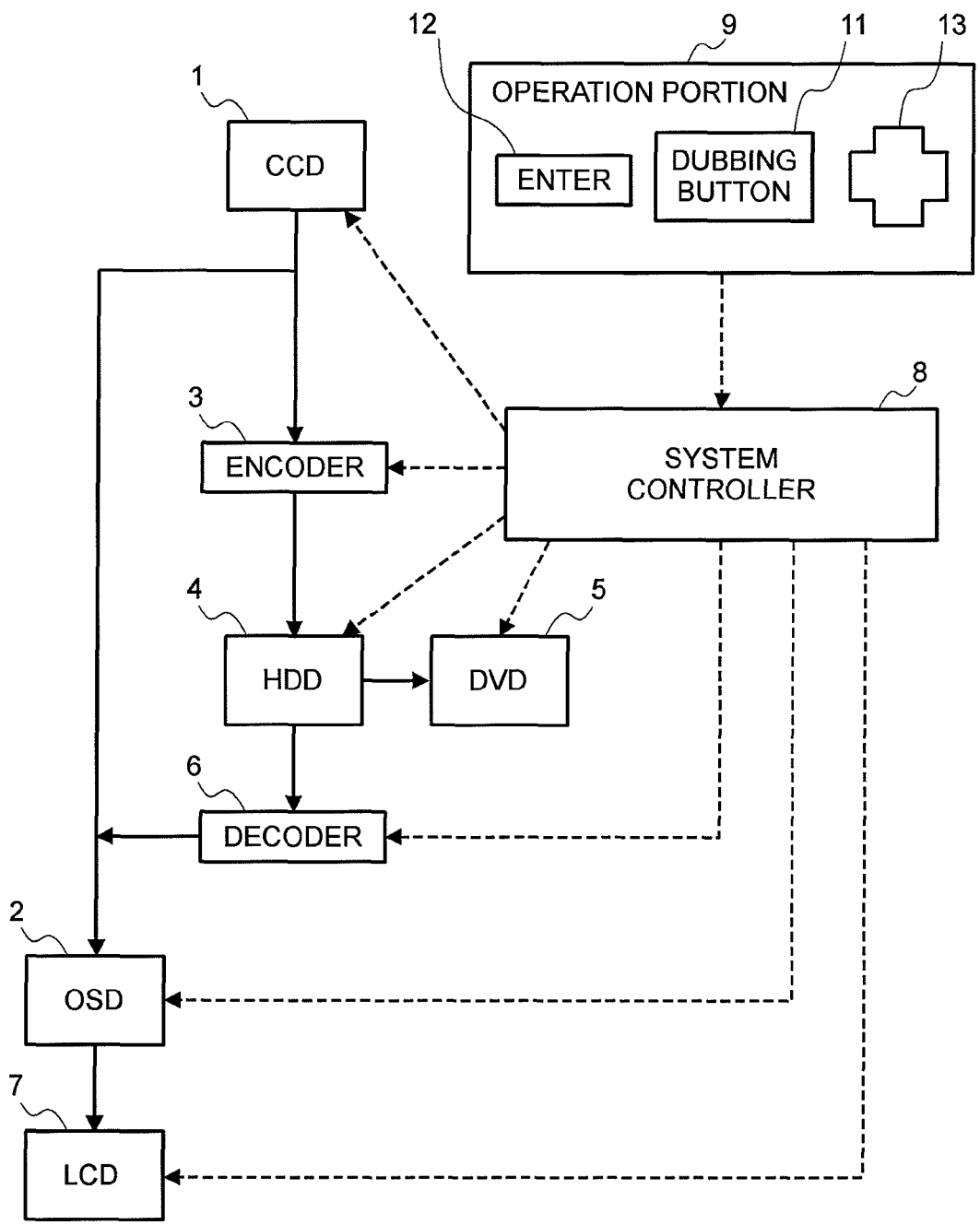
FIG. 1 is a block diagram showing the configuration of an example video camera according to an example embodiment of the present invention.

Before beginning a detailed description of the subject invention, mention of the following is in order. In the detailed description to follow, example screen displays, sizes and capacities may be given, although the present invention is not limited to the same. Well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. In other instances, detailed descriptions of well-known methods and components are omitted so as not to obscure the description of the invention with unnecessary/excessive detail. Multiple line (e.g., parallel) connections (including support components/circuitry) may be shown as a single line for simplicity of illustration and discussion, and so as not to obscure the invention. Arrowed or other interconnections shown between components may allow flow of information, etc. in a bidirectional manner. Where specific details (e.g., circuits, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software.

Although example embodiments of the present invention will be described using an example video camera environment, practice of the invention is not limited thereto, i.e., the invention may be able to be practiced with other types of electronic devices (e.g., cell phones) in other types of environments.

Turning now to detailed description, video cameras are known as information recording apparatuses. The recording system of video cameras has been rapidly changing from a DV (digital video) system using a DV drive to either the HDD system using the hard disk drive (HDD) or DVD optical disk drive (DVD). However, in the case of an HDD-type camera (camera employing the HDD system), while it offers an advantage for implementing long-time continuous recording, an edit function for execution has to be used with a device, such as a computer or hard-disk mounted DVD recorder. As such, many persons or users refrain from using the edit function as it is inconvenient to use. In comparison, in the case of a DVD-type camera (camera employing the DVD system), while it is convenient in that playback can be performed directly by a DVD player, the recording time is 30 min. per side of the disk (DVD), which is shorter than that in the case of the HDD.

In recent years, hybrid video cameras making use of advantages of both the HDD and DVD systems have been developed. Such a hybrid video camera includes both the HDD and DVD, so that video images captured and stored in the HDD can easily be dubbed to the DVD without requiring connection of a video image cable and/or use of a personal computer. A dubbed DVD can easily be played back (reproduced) by a DVD player, or alternatively a DVD dubbed immediately after capturing can be handed or sent to, for example, a friend or relative, thereby widening a joyful usage range of the video camera for users.

A dubbing function of such a hybrid video camera can include, for example, a function for dubbing all video image scenes at one time and a function for dubbing a desired video image scene selected from thumbnail images displayed on an edit screen. These dubbing functions improve the ease of use or usability of the video camera. In addition, it is important to further improve the ease of use or usability by further multi-functionalizing the dubbing function.

As an example, it can be contemplated that a video camera includes various functions, such as described hereinbelow, and that various dubbing operations therefor can easily be executed in a mainbody of the camera. Example dubbing functions of interest, include: execution of dubbing to a DVD disk of all scenes of a large number of video images captured in the course of a long-term travel; a dubbing function for execution of dubbing in units of a travel date; a dubbing function for execution of dubbing while skipping over video images previously dubbed. In this case, the ease of use or usability of the video camera is further improved.

Dubbing in some video cameras is carried out in such a manner as described hereinbelow. That is, video image record information contained within the video camera is retrieved to a hard disk of a personal computer, hard-disk mounted DVD recorder, or the like device, and is then dubbed to the DVD disk by using an edit function of the personal computer, hard-disk mounted DVD recorder, or the like while being displayed on a TV screen. More particularly, a dubbing function is not included or conducted in a mainbody of the video camera.

That is, an edit-plus-dubbing function of the hard-disk mounted DVD recorder is carried out using function-related information displayed on the TV screen. For example, according to Patent Document 1 (JP-A-2005-318186) briefed above, a dubbing operation is carried out in the following manner. A window for displaying a video image, an operation key for controlling a recording operation for recording to the HDD, an operation key for controlling a playback operation of the video camera are displayed on a dubbing screen display on the TV screen. Then, the dubbing operation is carried out by using the remote control unit while a reproduced video image of the video camera is being displayed on the window. According to Patent Document 2 (JP-A-2006-80890) briefed above, items such as a title, recording time, and past dubbing history, are list-displayed on the TV screen, in which a dubbing (target) item is selected by the user by using a remote controller or the like.

Further, in most cases, such video cameras are devices that are not regularly used, but are used only in special events such as athletic meetings and during traveling, such that the dubbing function is required to be self-explanatory for operation and to be easily usable by any body without causing error. As an example for improving operability of a video camera is disclosed in Patent Document 3 (JP-A-2005-175616). According to the technique disclosed therein, in addition to a detail setting menu, a simple setting menu for frequent use is separately provided for camera functions of a video camera.

However, a main body of a video camera, which is required for portability, is compact or as small as a palm-top device, and the size of a monitor mounted to the video camera is about 2 to about 3 inches—which is extremely small as compared to the TV screen. As such, it is impossible for the monitor to display the dubbing function using the conventional TV screen.

Further, since the dubbing function is additionally provided to the video camera already having various functions, it is desired that the dubbing operability be simplified as much as possible. From these viewpoints, instead of such the system including the detail setting menu and the simple menu limited in function, a simplified system with high operability is demanded.

For example, if a video camera includes a dubbing guide function that enables anybody to easily perform multi-functional dubbing without erroneous dubbing by using a compact monitor of the video camera, ease of use or usability of the video camera is improved.

Turning now to discussion of the present invention, one object of the present invention is to improve the ease of use or usability of the information recording and/or playback apparatus.

In order to achieve the object, one aspect of the present invention is, in brief, an information recording and/or playback apparatus for dubbing onto a second recording medium all or some of plural pieces of information from a first recording medium in which the plural pieces of information are recorded. The apparatus includes a dubbing function that includes a plurality of dubbing functions respectively having different dubbing information selection methods. In the event of executing dubbing, identifiers enabling selection of one of the plurality of dubbing functions and a display screen for displaying an explanatory text regarding the respective dubbing function is displayed. In addition, when information is selected before the display screen is displayed, the information selection method of the respective dubbing function and an explanatory text to be displayed is changed corresponding to an information selection state.

According to the present invention, the ease of use or usability of the information recording and/or playback apparatus is improved.

Example embodiments of the present invention will now be described in detail herebelow, with reference to the accompanying drawings.

FIG. 1 is a block diagram showing the configuration of an example video camera according to one example embodiment of the present invention. A video image input through a focus lens (not shown) of the video camera is converted to an electric signal and is further converted to a digital signal (digital video image signal) in a CCD 1 (charge coupled device).

Character information and the like are superimposed or added by an OSD 2 (on-screen device) on the digital video image signal output from the CCD 1, and the signal is forwarded to an LCD 7 (liquid crystal display), whereby a captured video image is displayed on the LCD 7.

The digital video image signal output from the CCD 1 is forwarded also to an encoder 3. In the case the video image is a motion image, the video image signal is compressed and encoded, for example, in accordance with an MPEG-2 scheme (MPEG-2: Moving Picture Experts, and then is recoded to an HDD 4 ("HDD": hard disk (or disc) drive) (which may correspond to a first recording medium in the appended claims) in accordance with a selected mode. Further, depending on, for example, various operation and information input by a user, video image data recorded in the HDD 4 is copied or moved to thereby be dubbed to a DVD 5 ("DVD": digital versatile disc) (which may correspond to a second recording medium in the appended claims). In this case, the term "copying" refers to a dubbing method in which dubbed (source) video image data remains in the HDD, and the term "moving" refers to a dubbing method in which dubbed (source) video image data does not remain in the HDD.

The compressed digital video image signal recorded in the HDD 4 is decoded by a decoder 6, whereby a played back image or thumbnail image thereof is displayed on the OSD 2 or the LCD 7.

Total control of the entirety of the video camera is performed by a system controller 8. Various operation and information input by the user is carried out by using an operation portion 9 that is configured to include a dubbing button 11, an enter button 12, and a cross button 13.

The HDD 4 according to the present embodiment has a size of one inch and a recoding (storage) capacity of 8 GB (gigabytes), and the DVD 5 according to the embodiment is an 8 cm disk and has a recoding (storage) capacity of 1.4 GB.

Figure 2:
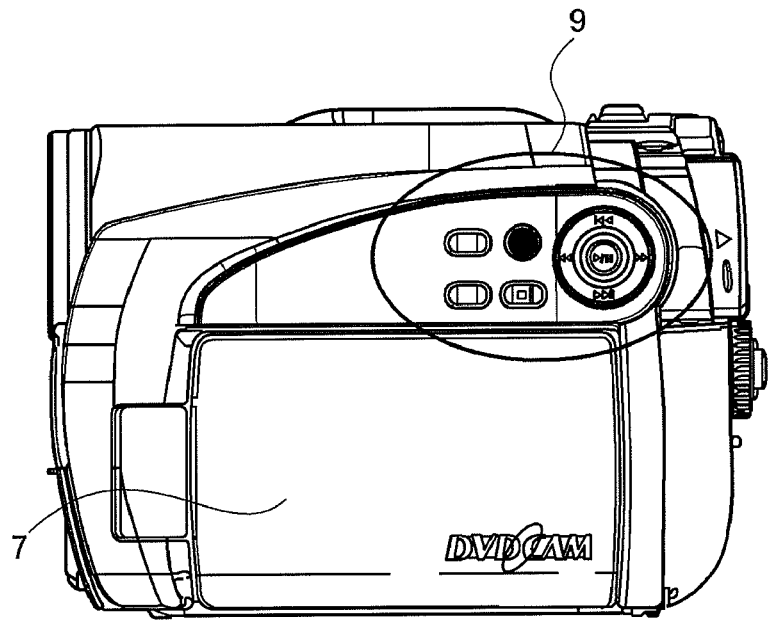
FIG. 2A is a broadside front view of the video camera according to the example embodiment.
FIG. 2B is a perspective view of the video camera according to the example embodiment.
Figure 2:
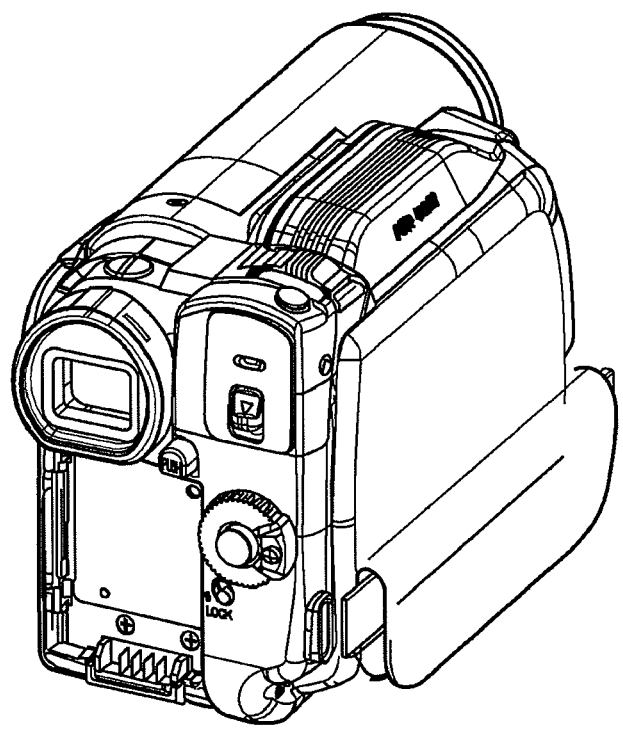

FIGS. 2A and 2B, respectively, are exterior views of the example video camera of the example embodiment shown in FIG. 1. The main body of the video camera is compact or as small as a palm-top device. FIG. 2A is a broadside front view of the video camera, and FIG. 2B is a rear-side perspective view thereof. The user operates the operation portion 9 while seeing the display of the LCD 7.

Figure 3:
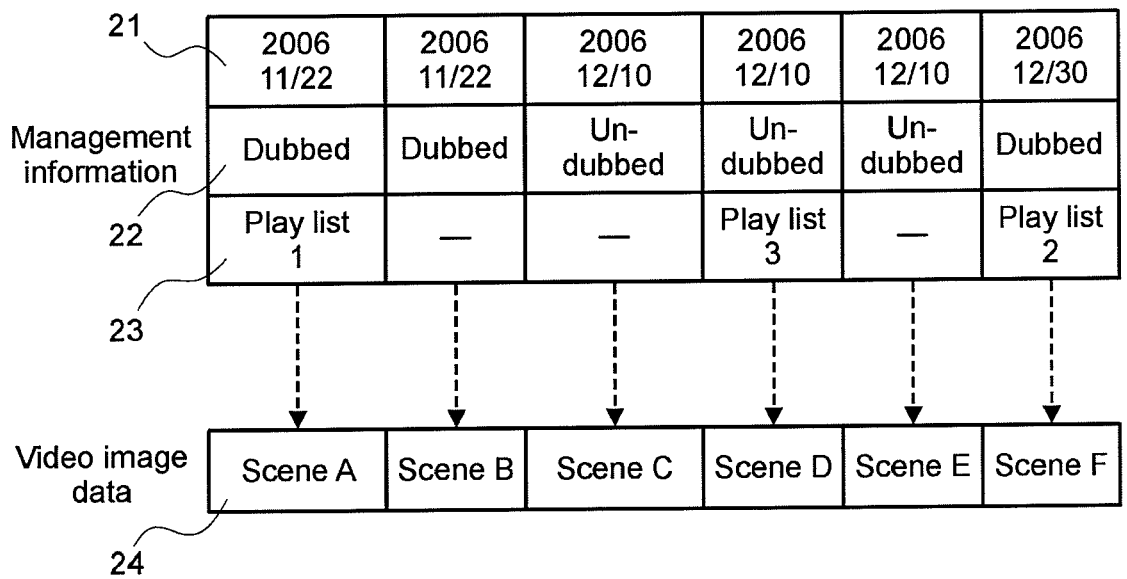
FIG. 3 is an example image representation of example video image data and management information thereof stored in a hard disk in accordance with the example embodiment.

FIG. 3 is an example image representation of example video image data and management information thereof stored in the HDD 4 of the example embodiment. The management information includes date information items 21, dubbed or un-dubbed information items 22, and play list information items 23 that respectively correspond to the video image scenes 24. For example, FIG. 3 indicates that, in the case of a scene A, it is recorded on "Nov. 22, 2006" (recorded date), is already dubbed, and recorded in a play list 1; and in the case of a scene B, it is recorded on "Nov. 22, 2006" and is dubbed, and no play list exists therefor.

Figure 4:
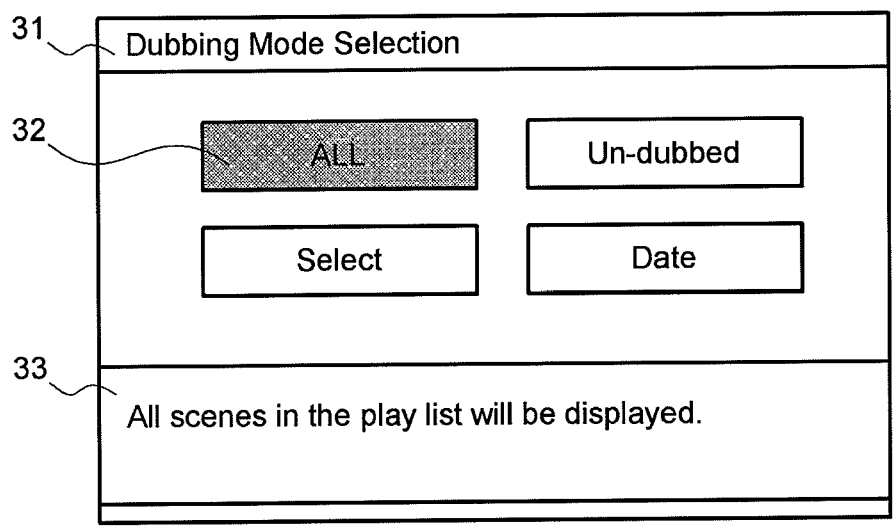
FIG. 4 is an example Dubbing Mode Selection screen for selection of a dubbing mode of a dubbing guide in accordance with the example embodiment.

Turning next to a dubbing guide, in response to depression by the user of the dubbing button 11 of the operation portion 9, a dubbing guide screen is displayed on the LCD 7. FIG. 4 is an example of a dubbing guide screen that includes a title bar 31, identifiers 32 indicative of respective dubbing functions (each of the functions is also denoted by numeral 32, hereinbelow), and a dubbing scene display 33. Four dubbing functions are provided as described below, and selecting methods corresponding to the functions for dubbing video image scenes are different from one another.

That is, the dubbing guide screen shown in FIG. 4 displays selectable choices of "All," "Select," "Date," and "Un-dubbed." "All" represents an all-scene dubbing method that permits dubbing of all scenes. "Select" represents a scene selection method that permits the user to select a desired dubbing scene for dubbing. "Date" represents a date selection dubbing method that permits dubbing of a scene(s) of a date to be selected by the user. "Un-dubbed" represents an un-dubbed scene dubbing method that permits dubbing of an un-dubbed scene(s). When a cursor is placed on any one of the identifiers 32 of the dubbing functions for selection, an explanatory text regarding the contents of a corresponding dubbing scene to be dubbed by the selected dubbing function is displayed in the field of the dubbing scene display 33.

The present example shows that the cursor is placed on "All" displayed as one of the dubbing functions 32 choices, and example guidance test indicating that "All scenes in the play list will be displayed." is displayed in the field of the dubbing scene display 33.

Further, a selection range of scenes to be dubbed by the four dubbing functions can be changed in accordance with a type of display before dubbing button 11 operation, and a dubbing scene can be verified.

Figure 5A:
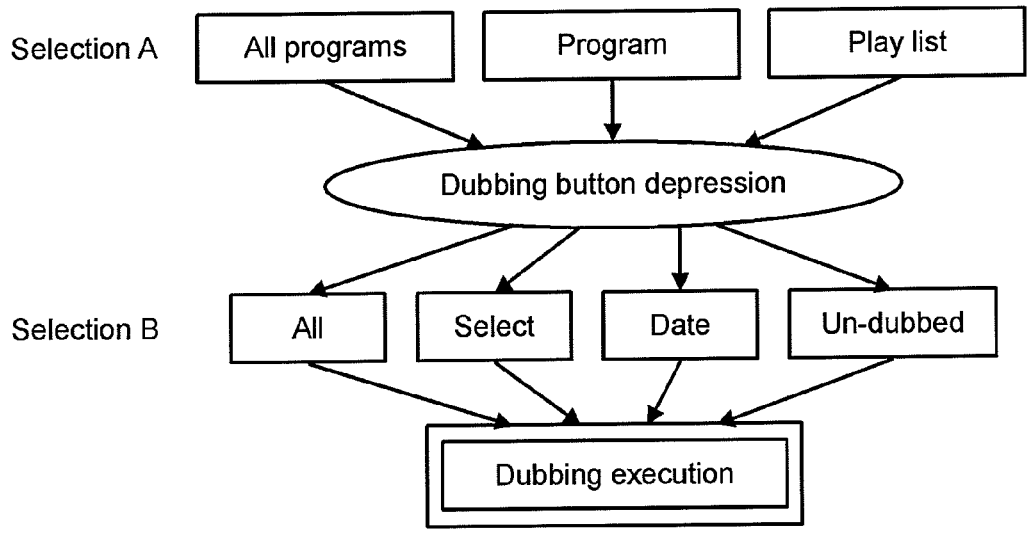
FIG. 5A is a schematic view showing the relationship between dubbing-related monitor display before and after an operation of a dubbing button and the operation of the dubbing button.
Figure 5B:
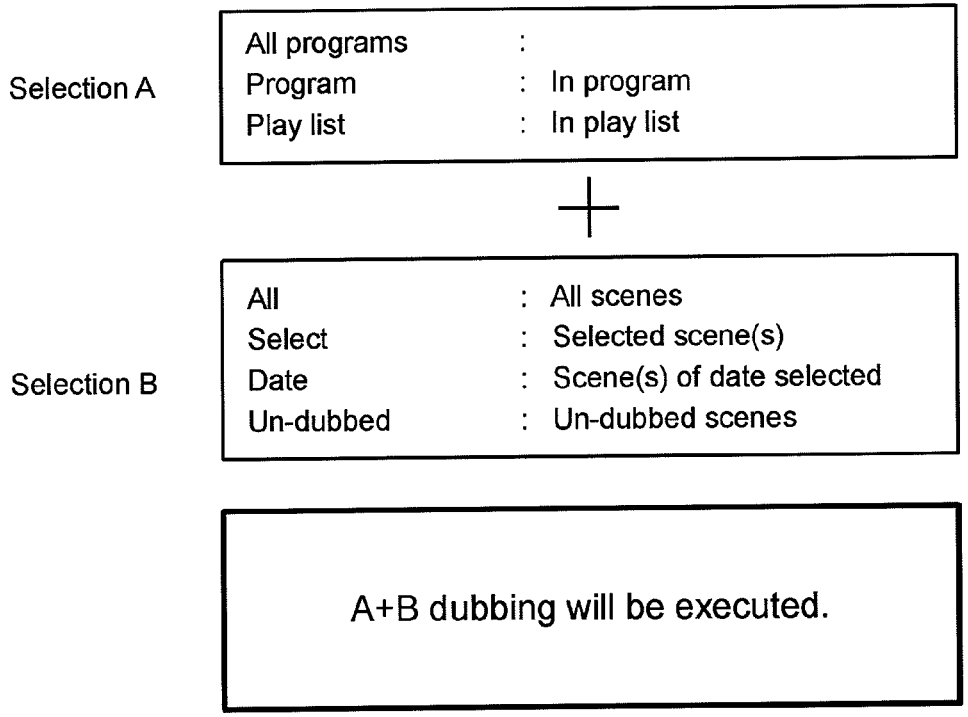
FIG. 5B is a schematic view showing an example relationship between the dubbing-related monitor display before and after the operation of the dubbing button and dubbing scene display.

FIGS. 5A and 5B are schematic views showing example dubbing functions along an example flow of operations by the user in the case of a user designation of a combination of <Selection A> and <Selection B>. <Selection A> (FIG. 5B) is indicative of a display state of the screen of the LCD 7 before the dubbing button 11 operation, and <Selection B> is indicative of a display state of the LCD 7 (screen) after the dubbing button 11 operation. The example dubbing guide will be described in detail herebelow with reference to FIGS. 5A and 5B.

Example <Selection A> of FIG. 5A, more specifically, is indicative that the LCD 17 screen before depression of the dubbing button 11 and displays example categories "All programs," "Program," and "Play list." More particularly, video image scenes captured and recorded are collectively managed in predetermined units of groups of video image scenes, and one group of video image scene constitutes one "Program." For example, video image scenes captured and recorded on the same date may be collectively managed as one "Program." However, when the number of video image scenes captured and recorded exceeds a predetermined number, the video image scenes are managed as two or more "Programs," depending on the case. The "All programs" refer to all "Programs" stored in the video camera. The "Play list" is constituted of a combination of arbitrary video image scenes. Example <Selection B> is indicative of the example four functions respectively represented by "All," "Select," "Date," and "Un-dubbed," and dubbing is executed in accordance with operation (i.e., user-selection) of <Selection A> and <Selection B>.

FIG. 5B is an example view showing that the dubbing scene display 33 of the dubbing guide is changed depending on the combination of <Selection A> and <Selection B>. More specifically, FIG. 5B is indicative that under <Selection A>, nothing is displayed in correspondence to "All programs," "In program" is displayed as a part of the dubbing scene display 33 in correspondence to "Program," and "In program" is added as a part of the dubbing scene display 33 in correspondence to "Play list." FIG. 5B is further indicative that under <Selection B>, "All scenes," "Selected scene," and "Scenes of the selected date," are added to the dubbing scene display 33 in correspondence to "All," "Date," and "Un-dubbed," respectively.

For example, suppose that the screen of the LCD 7 is set to the dubbing guide screen by depression of the dubbing button 11 while in the state "Play list" shown on under <Selection A>, and the cursor is placed on the dubbing function "All." In this case, "All scenes" (under <Selection B>) in "Play list" (under <Selection A>) are combined together, whereby the "A+B dubbing will be executed." Indication of the dubbing scene display 33 is changed to display "Dubbing of all scenes in the play list will be executed."

Thus, the user is able to view and verify the dubbing scene display 33 before dubbing execution to thereby be able to prevent erroneous operation resulting in dubbing of undesired scenes.

Example relationships between the respective dubbing functions and dubbing scenes (scenes to be dubbed by the functions) will be described herebelow, with reference to a dubbing guide screen in accordance with the present embodiment.

More particularly, example FIGS. 6 to 17 shows dubbing functions with the example combinations of <Selection A> and <Selection B>, dubbing scenes in the dubbing functions, and dubbing scene explanatory displays 33 corresponding to the respective dubbing functions. Such example FIGS. are now explained in greater details as follows, according to the four types of categories.

(1) "All"

Figure 6A:
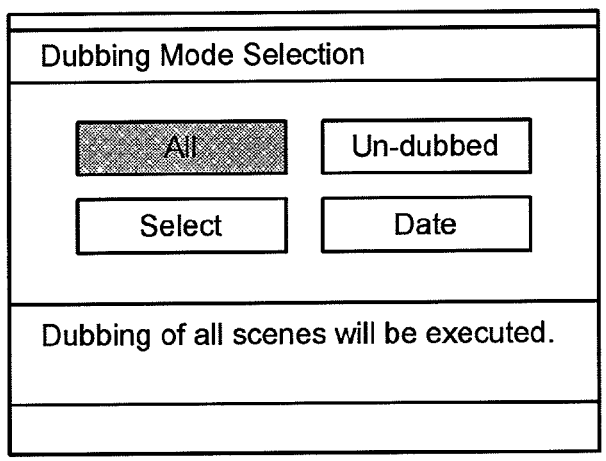
FIG. 6A is a representation of an example dubbing scene in the example event of combination of "All" and "All Programs" for a dubbing selection.
Figure 6B:
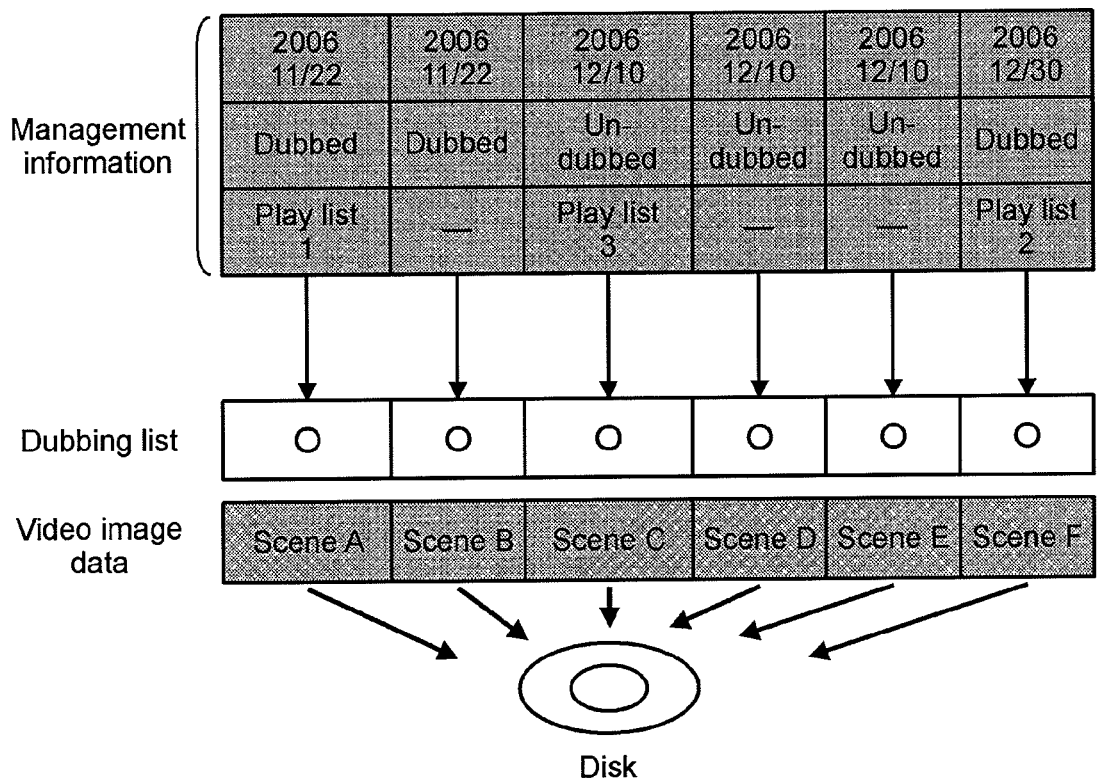
FIG. 6B is a schematic representation of example contents of scenes in the state of FIG. 6A.

Example FIGS. 6A and 6B are views of the contents of scenes to be dubbed when the cursor is placed on "All" on the dubbing guide screen displayed on the LCD 7 in response to depression of the dubbing button 11 after "All programs" display (display of all scenes in the program/play list) on the LCD 7.

FIG. 6A shows that, when the cursor is placed on "All" on the dubbing guide screen, "Dubbing of all scenes will be executed." is displayed in the field of the dubbing scene display 33. In this case, "All" (all scene dubbing) represents a dubbing method that dubs scenes in the HDD 4 sequentially from the top and onto the DVD 5, regardless of whether the scenes are dubbed or un-dubbed.

FIG. 6B is an example schematic representation of the contents of scenes to be dubbed from the HDD 4 to the DVD 5 when "Dubbing of all scenes will be executed." is displayed in the field of the dubbing scene display 33. More specifically, shading of the dubbing guide screen is indicative that management information and all scenes of video image data will be dubbed to the DVD 5 from all programs recorded in the HDD 4.

Figures 7A, 7B:
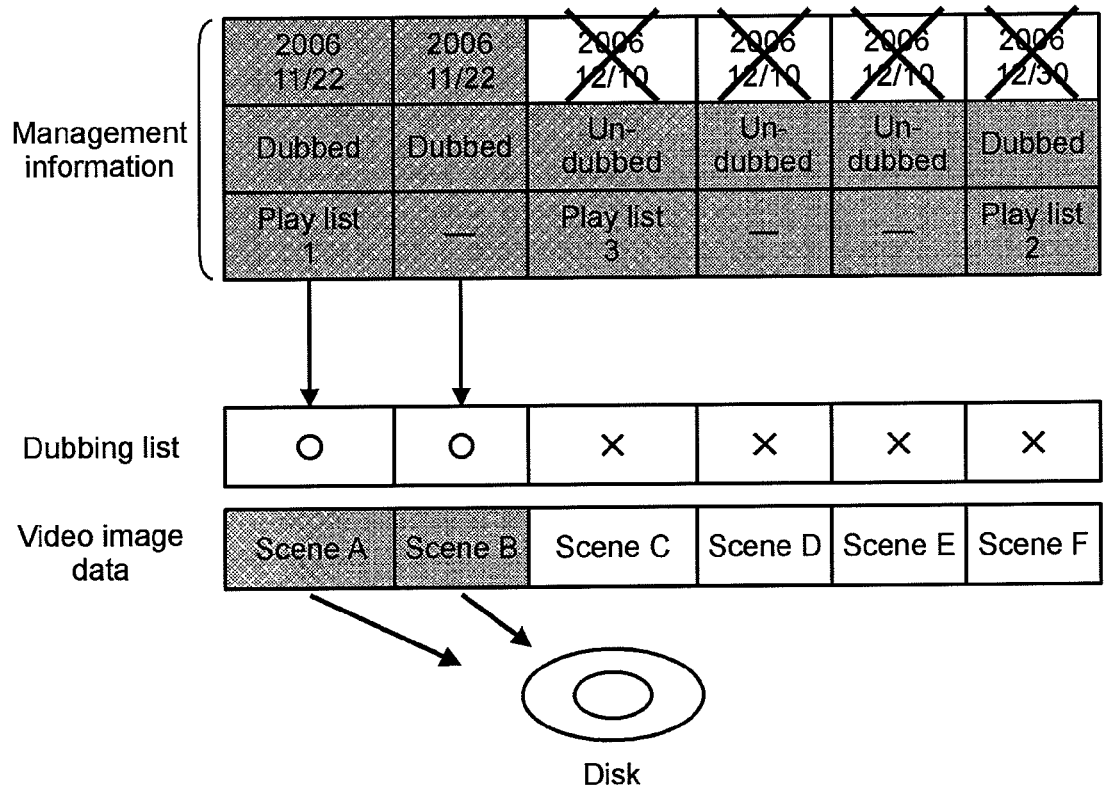
FIG. 7A is a representation of a dubbing scene in the example event of combination of "All" and "Program" for a dubbing selection.
FIG. 7B is a schematic representation of example contents of scenes in the state of FIG. 7A.

Example FIGS. 7A and 7B are views of the contents of scenes to be dubbed when the cursor is placed on "All" on the dubbing guide screen displayed on the LCD 7 in response to depression of the dubbing button 11 after "Program" display (display of all scenes in one program recorded in the HDD 4) on the LCD 7.

FIG. 7A shows that, when the cursor is placed on "All" on the dubbing guide screen, "Dubbing of all scenes in the program will be executed." is displayed in the field of the dubbing scene display 33.

FIG. 7B is an example schematic representation of the contents of scenes to be dubbed from the HDD 4 to the DVD 5 when "Dubbing of all scenes in the program will be executed." is displayed in the field of the dubbing scene display 33. More specifically, shading and "X"s of the guide screen is indicative that all scenes in one program recorded in the HDD 4 will be dubbed to the DVD 5. More specifically, dubbing of all scenes of the same date, such as "Nov. 22, 2006", i.e., scenes A and B, contained in one program, i.e., will be executed.

Figure 8A:
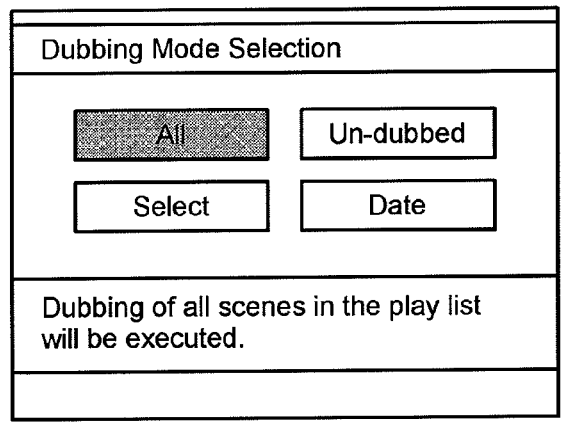
FIG. 8A is a representation of a dubbing scene in the example event of combination of "All" and "Play List" for a dubbing selection.
Figure 8B:
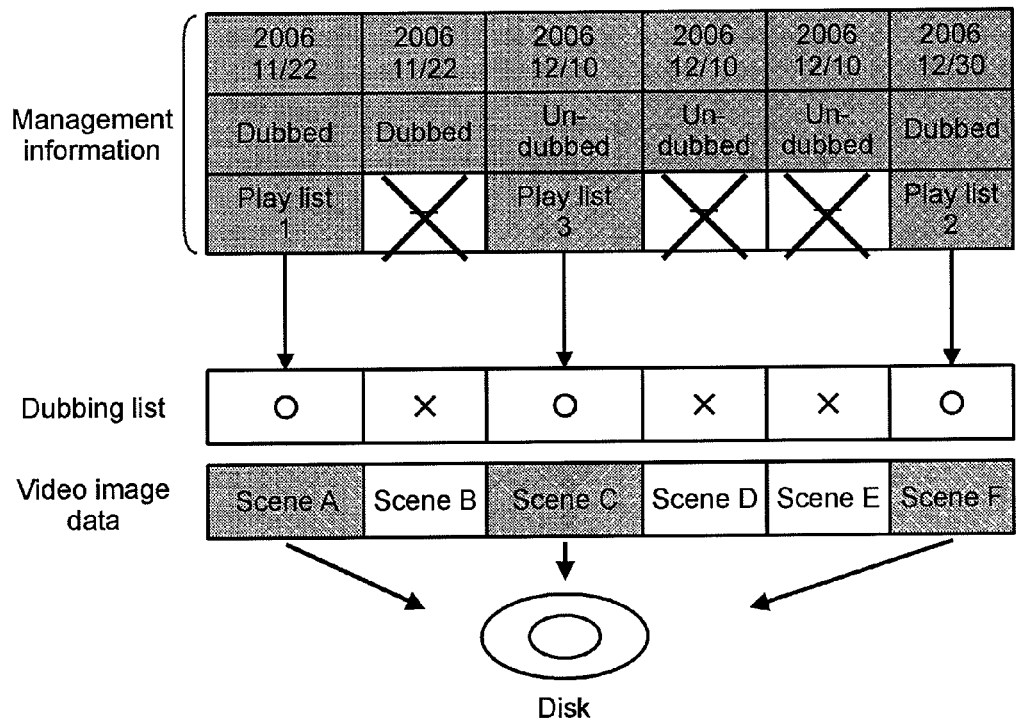
FIG. 8B is a schematic representation of example contents of scenes in the state of FIG. 8A.

Example FIGS. 8A and 8B are views of the contents of scenes to be dubbed when the cursor is placed on "All" on the dubbing guide screen displayed on the LCD 7 in response to depression of the dubbing button 11 after "Play list" display (display of all scenes in one program in a play list recorded in the HDD 4) on the LCD 7.

FIG. 8A shows that, when the cursor is placed on "All" on the dubbing guide screen, "Dubbing of all scenes in the play list will be executed." is displayed in the field of the dubbing scene display 33.

FIG. 8B is an example schematic representation of the contents of scenes to be dubbed from the HDD 4 to the DVD 5 when "Dubbing of all scenes in the play list will be executed." is displayed in the field of the dubbing scene display 33. More specifically, shading and "X"s of the guide screen is indicative that all scenes in the play list recorded in the HDD 4 will be dubbed to the DVD 5.

(2) "Select"

Figure 9A:
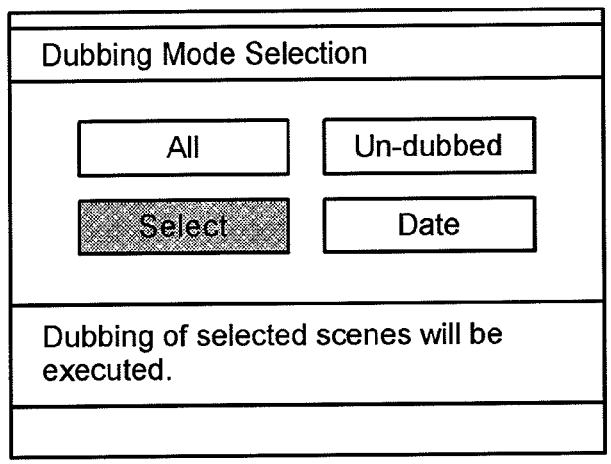
FIG. 9A is a representation of a dubbing scene in the example event of combination of "Select" and "All Programs" for a dubbing selection.
Figure 9B:
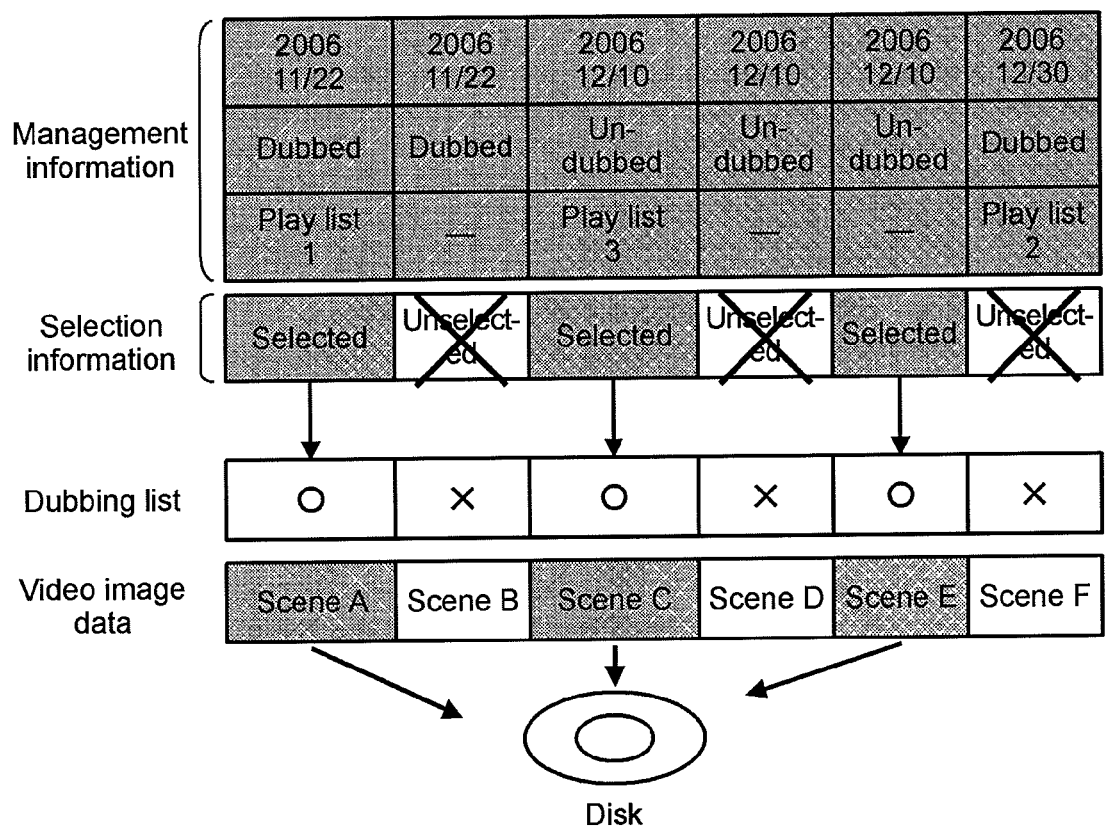
FIG. 9B is a schematic representation of example contents of scenes in the state of FIG. 9A.

Example FIGS. 9A and 9B are views of the contents of scenes to be dubbed when the cursor is placed on "Select" on the dubbing guide screen displayed on the LCD 7 in response to depression of the dubbing button 11 after "All programs" display (display of all scenes in the program/play list) on the LCD 7.

Figure 18:
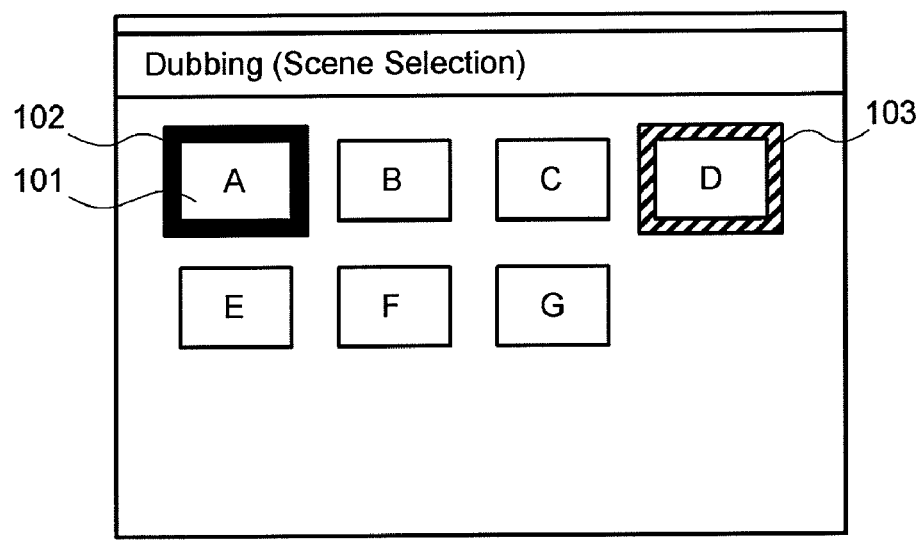
FIG. 18 is an example Dubbing (Scene Selection) screen in accordance with the example embodiment.

FIG. 9A shows that, when the cursor is placed on "Select" on the dubbing guide screen, "Dubbing of the selected scenes will be executed." is displayed in the field of the dubbing scene display 33. "Select" (scene selection dubbing) represents a dubbing method that permits selection of scenes recorded in the HDD 4 and dubs only the selected scenes to the DVD 5. When the enter button 12 is depressed in the state the cursor is placed on "Select," the screen of the LCD 7 shifts to a scene selection screen of example FIG. 18, and a navigation field is displayed thereon, whereby scenes are selected by the user by using the cross button 13. In FIG. 18, numeral 101 denotes each thumbnail image of a scene recorded in the HDD 4, numeral 102 denotes a mark indicative of the position of the cursor, and numeral 103 denotes a mark put on a selected item.

FIG. 9B is an example schematic representation of the contents of scenes to be dubbed from the HDD 4 to the DVD 5 when "Dubbing of selected scenes will be executed." is displayed in the field of the dubbing scene display 33. More specifically, shading and "X"s of the guide screen is indicative that dubbing to the DVD 5 will be executed in accordance with selection information selected on the scene selection screen of FIG. 18 from all programs recorded in the HDD 4.

Figures 10A, 10B:
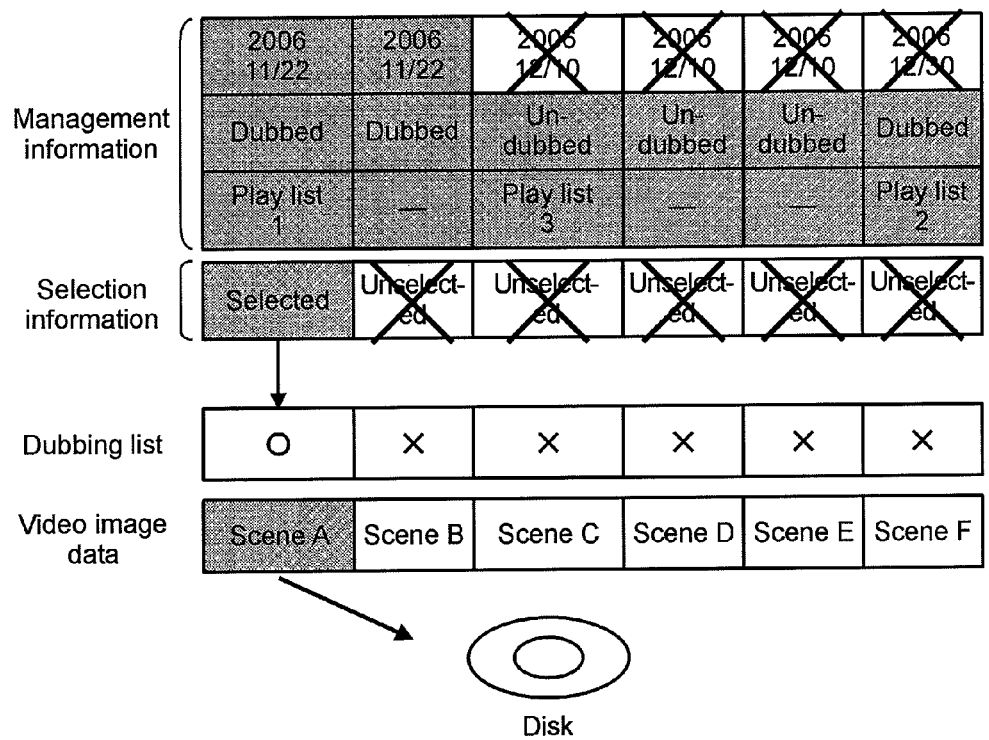
FIG. 10A is a representation of a dubbing scene in the example event of combination of "Select" and "Program" for a dubbing selection.
FIG. 10B is a schematic representation of example contents of scenes in the state of FIG. 10A.

Example FIGS. 10A and 10B are views respectively showing the dubbing guide screen of the LCD 7 after "Program" display (display of all scenes in one program recorded in the HDD 4) and the contents of scenes to be dubbed when the cursor is placed on "Select" on the dubbing guide screen.

FIG. 10A shows that, when the cursor is placed on "Select" on the dubbing guide screen, "Dubbing of the selected scenes in the program will be executed." is displayed in the field of the dubbing scene display 33.

FIG. 10B is an example schematic representation of the contents of scenes to be dubbed from the HDD 4 to the DVD 5 when "Dubbing of selected scenes in the program will be executed." is displayed in the field of the dubbing scene display 33. More specifically, shading and "X"s of the guide screen is indicative that dubbing to the DVD 5 will be executed in accordance with selection information selected on the scene selection screen of FIG. 18 from one program recorded in the HDD 4.

Figure 11A:
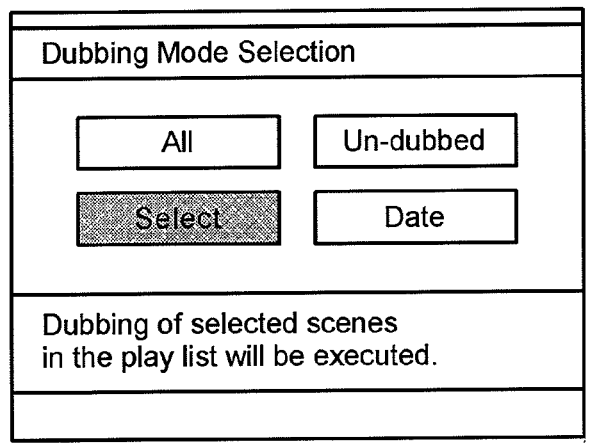
FIG. 11A is a representation of a dubbing scene in the example event of combination of "Select" and "Play List" for a dubbing selection.
Figure 11B:
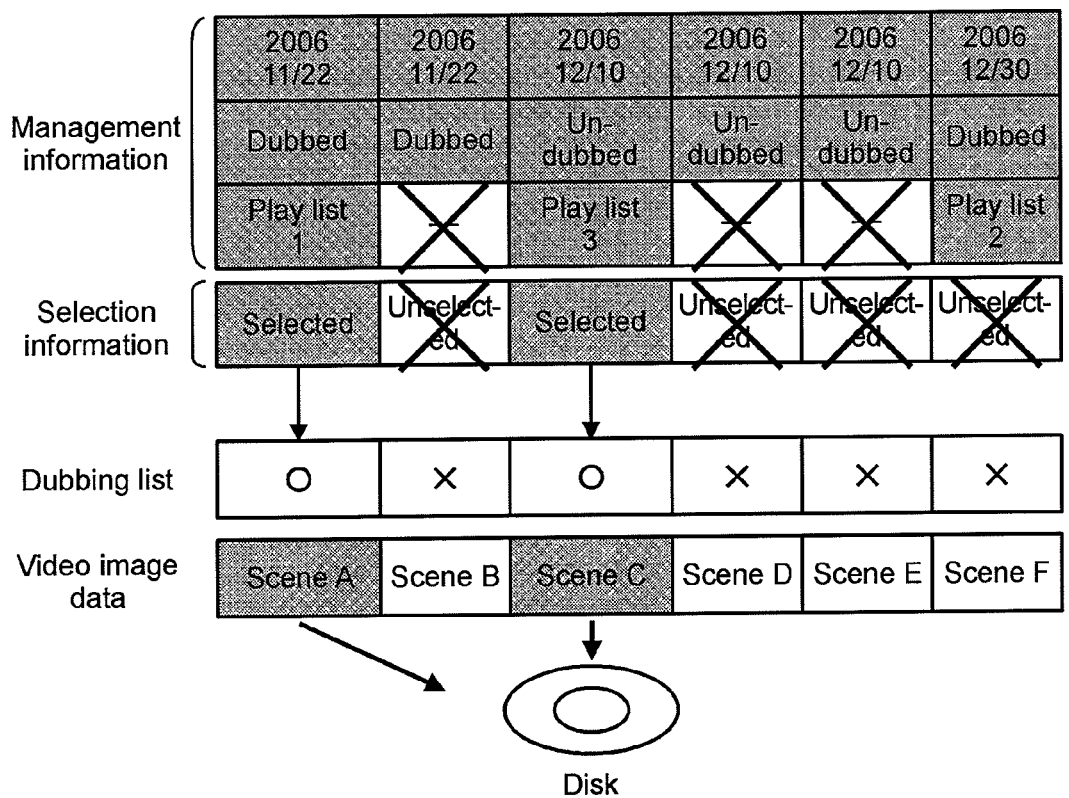
FIG. 11B is a schematic representation of example contents of scenes in the state of FIG. 11A.

Example FIGS. 11A and 11B show the contents of scenes when the cursor is placed on "Select" on the dubbing guide screen displayed on the LCD 7 in response to depression of the dubbing button 11 after "Play list" display (display of all scenes in one program in a play list recorded in the HDD 4) on the LCD 7.

FIG. 11A shows that, when the cursor is placed on "Select" on the dubbing guide screen, "Dubbing of the selected scenes in the play list will be executed." is displayed in the field of the dubbing scene display 33.

FIG. 11B is an example schematic representation of the contents of scenes to be dubbed from the HDD 4 to the DVD 5 when "Dubbing of the selected scenes in the play list will be executed." is displayed in the field of the dubbing scene display 33. More specifically, shading and "X"s of the guide screen is indicative that dubbing to the DVD 5 will be executed in accordance with selection information selected on the scene selection screen of FIG. 18 from the play list recorded in the HDD 4.

Even when a scene corresponding to the respective "All programs," "Program," or "Play list" is being displayed before depression of the dubbing button 11, the dubbing guide screen can be displayed in the manner that a dubbing scene is selected, and then the dubbing button 11 is depressed. In this case, when "Select" is selected, scene selection can be started from the state where the scene is preliminarily selected before depression of the dubbing button 11 on the scene selection screen of FIG. 18. This is implemented in the manner that selection information generated by the selection of the scene before the depression of the dubbing button 11 is stored, and the selection information is read out in response to selection of "Select" on the dubbing guide screen.

(3) "Date"

Figures 12A, 12B:
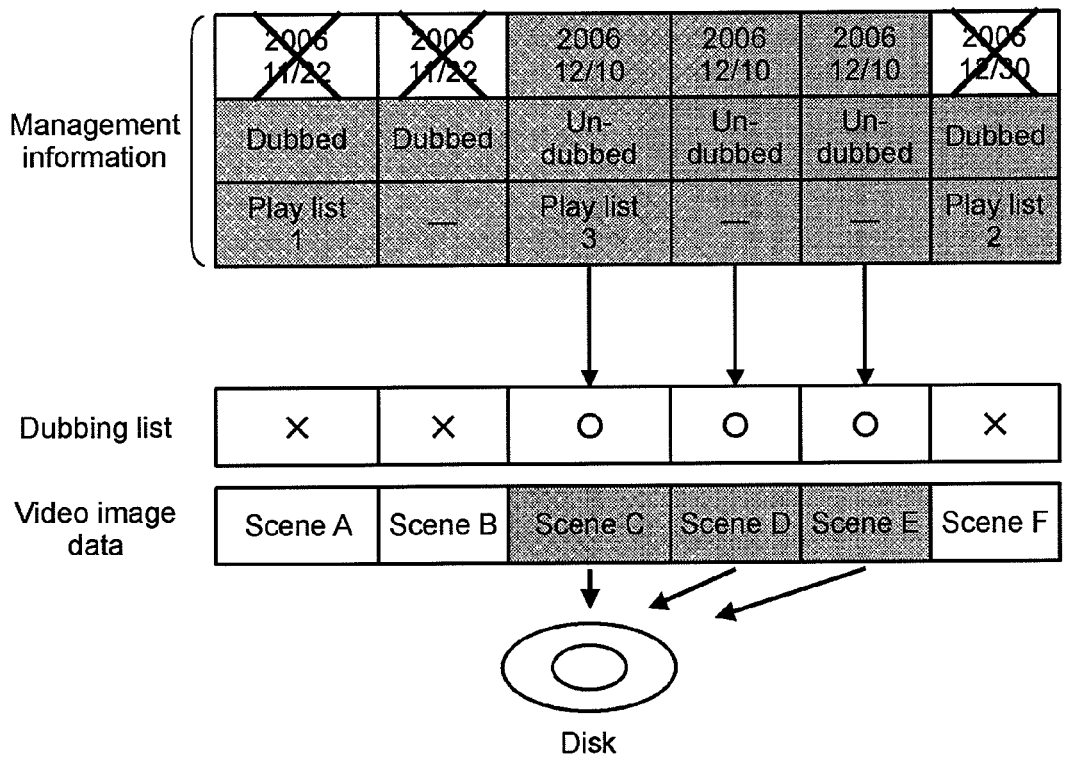
FIG. 12A is a representation of a dubbing scene in the example event of combination of "Date" and "All Programs" for a dubbing selection.
FIG. 12B is a schematic representation of example contents of scenes in the state of FIG. 12A.

Example FIGS. 12A and 12B are views respectively showing the dubbing guide screen on the LCD 7 after "All programs" display (display of all scenes in program/play list) and the contents of scenes to be dubbed when the cursor is placed on "Date" on the dubbing guide screen.

FIG. 12A shows that, when the cursor is placed on "Date" on the dubbing guide screen, "Dubbing of scenes of the selected date will be executed." is displayed in the field of the dubbing scene display 33. "Date" (date selection dubbing) represents a dubbing method that permits the user to select a date desired for dubbing and that then execute dubbing of all scenes of the selected date.

Figure 19:
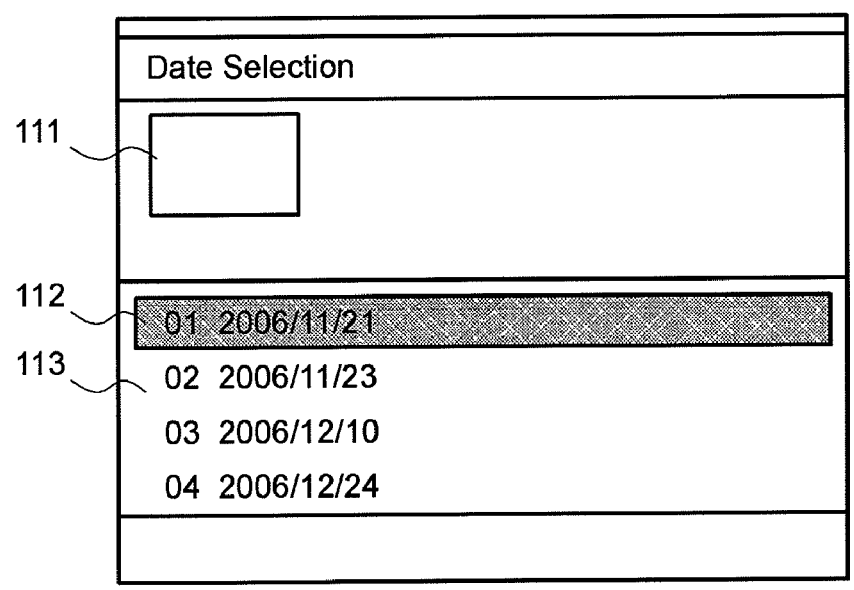
FIG. 19 is an example Date Selection screen of the dubbing guide in accordance with the example embodiment.

When the enter button 12 is depressed in the state the cursor is placed on the "Date," the screen of the LCD 7 shifts to a date selection screen of example FIG. 19. More specifically, the screen shifts to the date selection screen list displaying dates respectively corresponding to program/play list displayed immediately before entrance to the dubbing mode, and the user selects a desired date on the date selection screen by using the cross button 13. In FIG. 19, numeral 111 denotes a thumbnail image of a top scene of a date present in the position of the cursor, numeral 112 denotes a mark indicative of the position of the cursor, and numeral 113 denotes a list of dates.

FIG. 12B is an example schematic representation of the contents of scenes to be dubbed from the HDD 4 to the DVD 5 when "Dubbing of scenes of the selected date will be executed." is displayed in the field of the dubbing scene display 33. More specifically, shading and "X"s of the guide screen is indicative that a scene corresponding to each date in one program recorded in the HDD 4 will be dubbed to the DVD 5 in accordance with the date selected on the date selection screen of FIG. 19. In the shown example, the date "Dec. 10, 2006" is selected, and dubbing of scenes C, D, and E recorded on the selected date is executed.

Figures 13A, 13B:
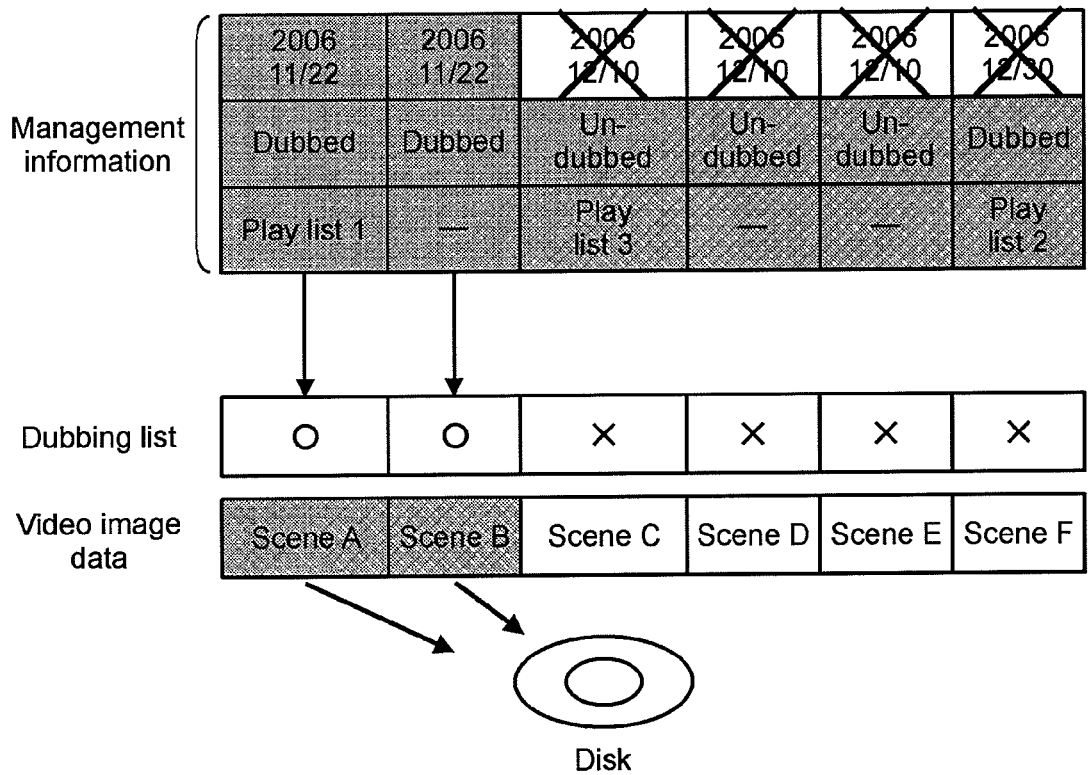
FIG. 13A is a representation of a dubbing scene in the example event of combination of "Date" and "Program" for a dubbing selection.
FIG. 13B is a schematic representation of example contents of scenes in the state of FIG. 13A.

Example FIGS. 13A and 13B are views showing the contents of scenes to be dubbed when the cursor is placed on "Date" on the dubbing guide screen on the LCD 7 displayed in response to depression of the dubbing button 11 after "Program" display (display of all scenes in one program recorded in the HDD 4).

FIG. 13A shows that, when the cursor is placed on "Date" on the dubbing guide screen, "Dubbing of scenes of the selected date in the program will be executed." is displayed in the field of the dubbing scene display 33.

FIG. 13B is an example schematic representation of the contents of scenes to be dubbed from the HDD 4 to the DVD 5 when "Dubbing of scenes of the selected date in the program will be executed." is displayed in the field of the dubbing scene display 33. More specifically, shading and "X"s of the guide screen is indicative that dubbing will be executed to the DVD 5 will be executed in accordance with the date selected on the date selection screen of FIG. 19 from one program recorded in the HDD 4.

Figures 14A, 14B:
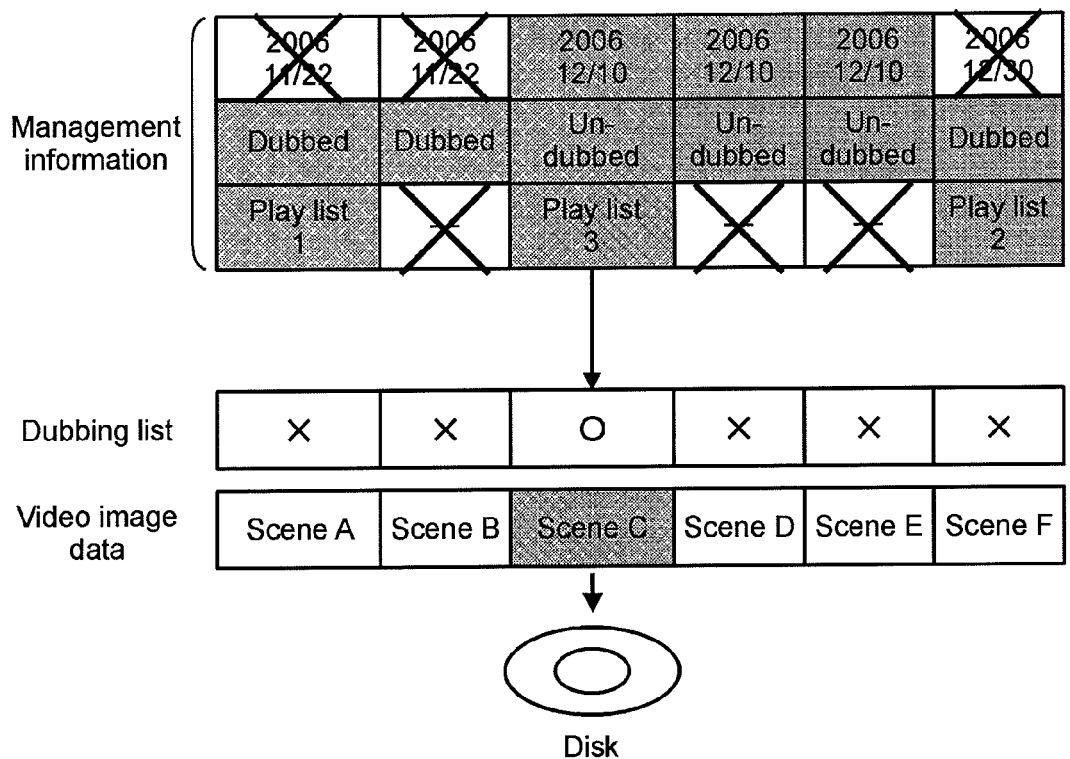
FIG. 14A is a representation of a dubbing scene in the example event of combination of "Date" and "Play List" for a dubbing selection.
FIG. 14B is a schematic representation of example contents of scenes in the state of FIG. 14A.

Example FIGS. 14A and 14B are views showing the contents of scenes to be dubbed when the cursor is placed on "Date" on the dubbing guide screen on the LCD 7 displayed in response to depression of the dubbing button 11 after "Play list" display (display of all scenes in one program in the play list recorded in the HDD 4).

FIG. 14A shows that, when the cursor is placed on "Date" on the dubbing guide screen, "Dubbing of scenes of the selected date in the play list will be executed." is displayed in the field of the dubbing scene display 33.

FIG. 14B is an example schematic representation of the contents of scenes to be dubbed from the HDD 4 to the DVD 5 when "Dubbing of scenes of the selected date in the play list will be executed." is displayed in the field of the dubbing scene display 33. More specifically, shading and "X"s of the guide screen is indicative that dubbing will be executed to the DVD 5 will be executed in accordance with the date selected on the date selection screen of FIG. 19 from the play list recorded in the HDD 4.

(4) "Un-dubbed"

Figures 15A, 15B:
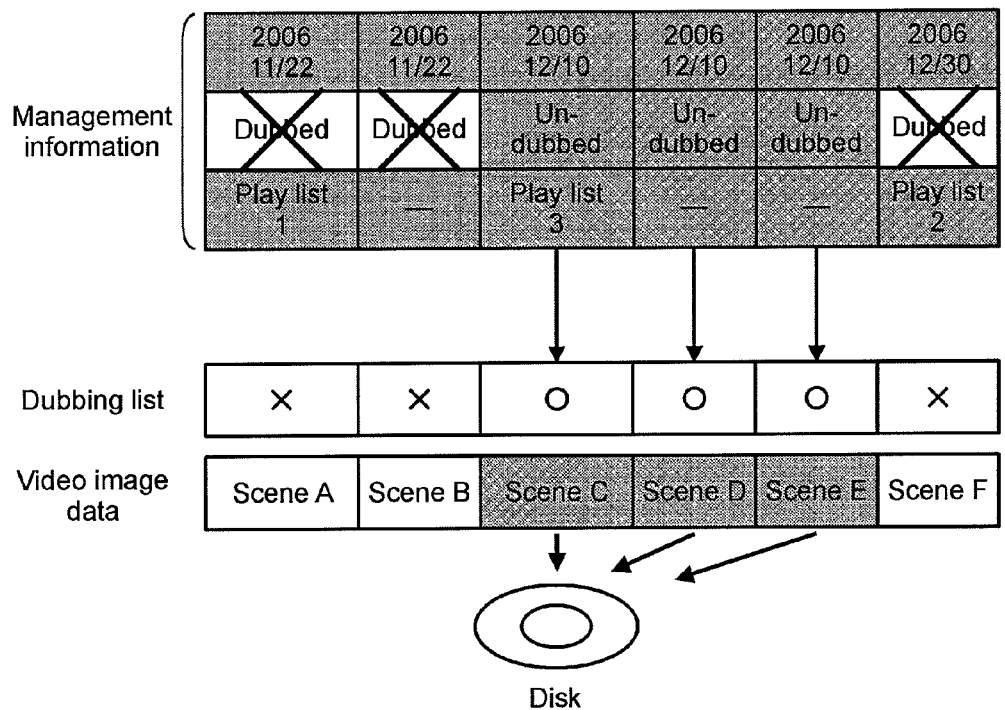
FIG. 15A is a representation of a dubbing scene in the example event of combination of "Un-dubbed" and "All Programs" for a dubbing selection.
FIG. 15B is a schematic representation of example contents of scenes in the state of FIG. 15A.

Example FIGS. 15A and 15B are views showing the contents of scenes to be dubbed when the cursor is placed on "Un-dubbed" on the dubbing guide screen displayed on the LCD 7 in response to depression of the dubbing button 11 after "All programs" display (display of all scenes in the program/play list).

FIG. 15A shows that, when the cursor is placed on "Un-dubbed" on the dubbing guide screen, "Dubbing of un-dubbed scenes will be executed." is displayed in the field of the dubbing scene display 33. "Un-dubbed" (un-dubbed scene dubbing) represents a dubbing method that executes dubbing of un-dubbed scenes in all-programs/program/play list displayed immediately before entrance into the dubbing mode.

FIG. 15B is an example schematic representation of the contents of scenes to be dubbed from the HDD 4 to the DVD 5 when "Dubbing of un-dubbed scenes will be executed." is displayed in the field of the dubbing scene display 33. More specifically, shading and "X"s of the guide screen is indicative that, in the un-dubbed scene dubbing, un-dubbed scenes in all programs in the HDD 4 will be dubbed to the DVD 5 in accordance with "Dubbed"-scene information contained in the management information for the video image data.

Figures 16A, 16B:
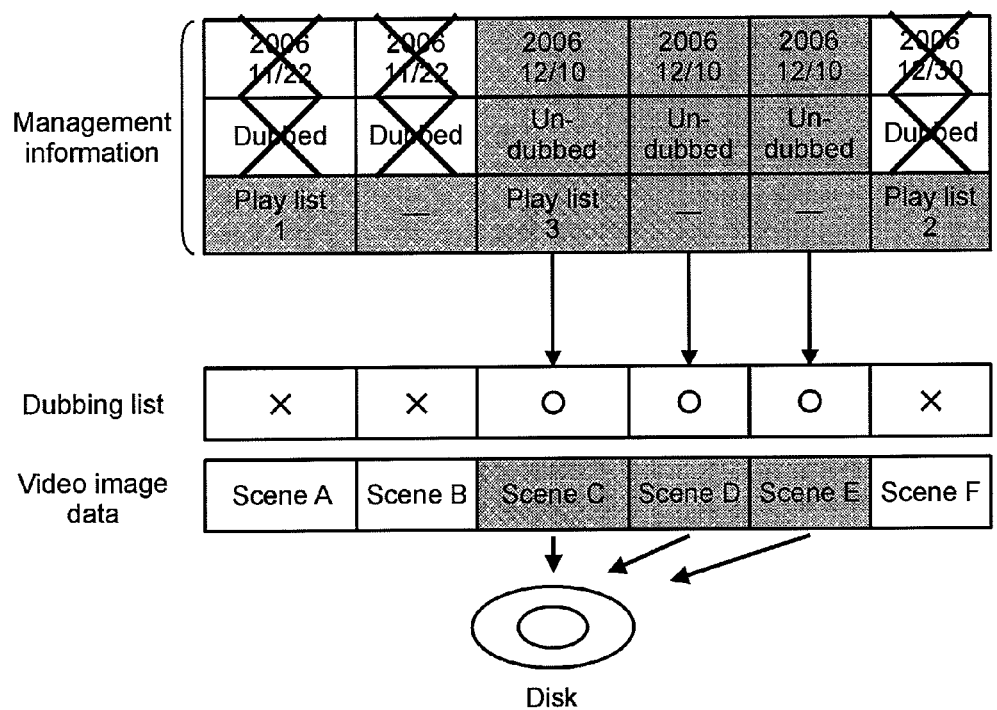
FIG. 16A is a representation of a dubbing scene in the example event of combination of "Un-dubbed" and "Program" for a dubbing selection.
FIG. 16B is a schematic representation of example contents of scenes in the state of FIG. 16A.

Example FIGS. 16A and 16B are views showing the contents of scenes to be dubbed when the cursor is placed on "Un-dubbed" on the dubbing guide screen displayed on the LCD 7 in response to depression of the dubbing button 11 after "Program" display (display of all scenes in one program recorded in the HDD 4).

FIG. 16A shows that, when the cursor is placed on "Un-dubbed" on the dubbing guide screen, "Dubbing of un-dubbed scenes in the program will be executed." is displayed in the field of the dubbing scene display 33.

FIG. 16B is an example schematic representation of the contents of scenes to be dubbed from the HDD 4 to the DVD 5 when "Dubbing of un-dubbed scenes in the program will be executed." is displayed in the field of the dubbing scene display 33. More specifically, shading and "X"s of the guide screen is indicative that un-dubbed scenes in one program in the HDD 4 will be dubbed to the DVD 5.

Figures 17A, 17B:
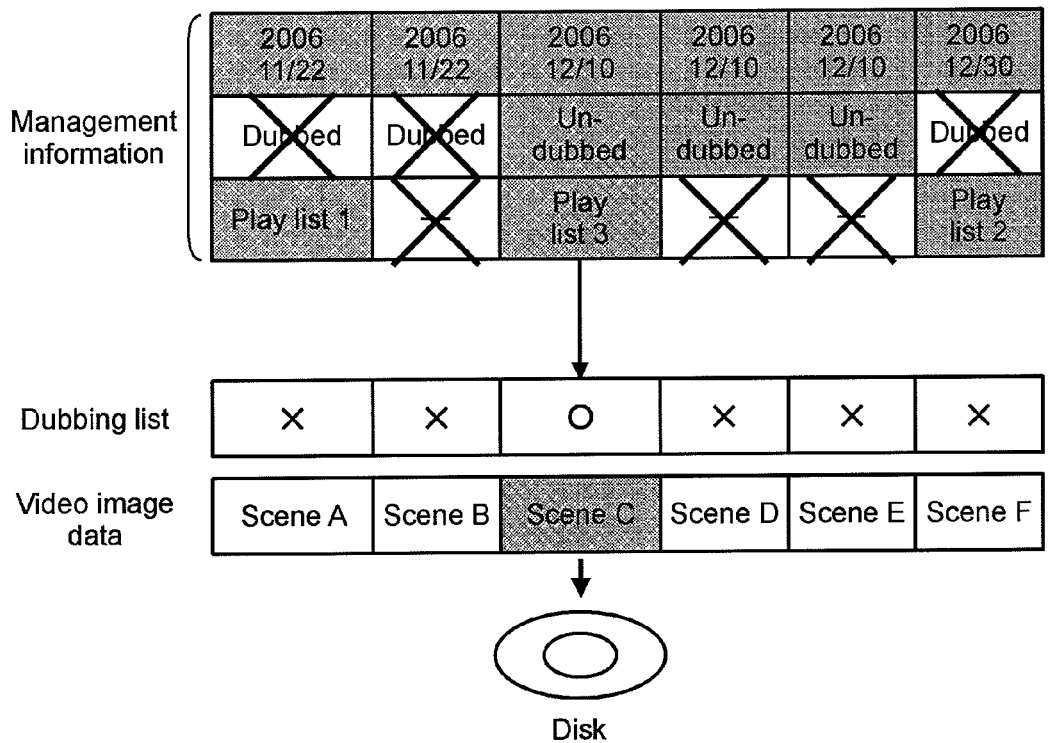
FIG. 17A is a representation of a dubbing scene in the example event of combination of "Un-dubbed" and "Play List" for a dubbing selection.
FIG. 17B is a schematic representation of example contents of scenes in the state of FIG. 17A.

Example FIGS. 17A and 17B are views showing the contents of scenes to be dubbed when the cursor is placed on "Un-dubbed" on the dubbing guide screen displayed on the LCD 7 in response to depression of the dubbing button 11 after "Play list" display (display of all scenes in one program in the play list recorded in the HDD 4).

FIG. 17A shows that, when the cursor is placed on "Un-dubbed" on the dubbing guide screen, "Dubbing of un-dubbed scenes in the play list will be executed." is displayed in the field of the dubbing scene display 33.

FIG. 17B is an example schematic representation of the contents of scenes to be dubbed from the HDD 4 to the DVD 5 when "Dubbing of un-dubbed scenes in the play list will be executed." is displayed in the field of the dubbing scene display 33. More specifically, shading and "X"s of the guide screen is indicative that un-dubbed scenes in the play list recorded in the HDD 4 will be dubbed to the DVD 5.

Discussion now turns to a second example embodiment. More particularly, the configuration can be formed such that the dubbing guide function is not used, but a shifting function for directly dubbing a scene(s) selected from a navigation screen is instead used.

Figure 20A:
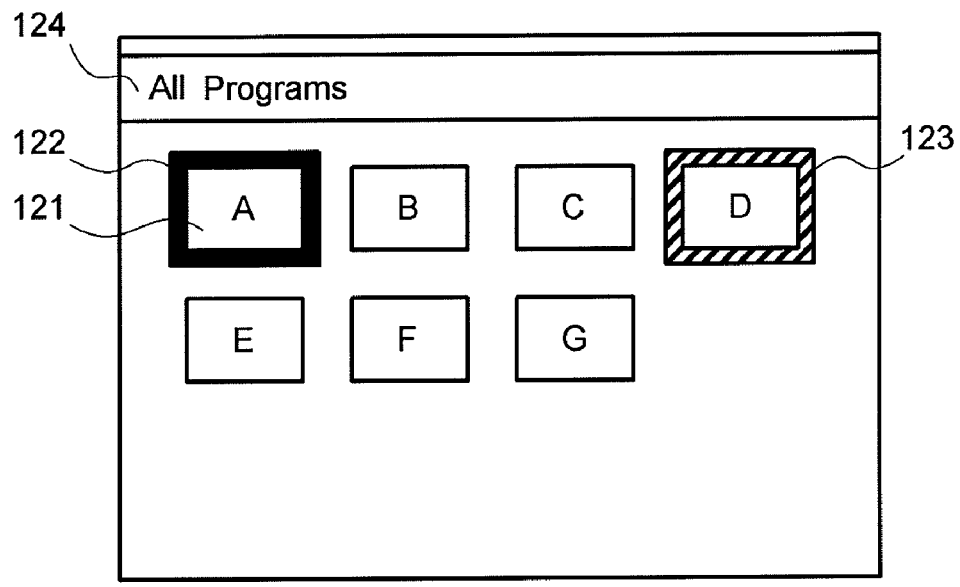
FIG. 20A is an example screen on which scene selection is carried out from a navigation screen in accordance with the example embodiment.
Figure 20B:
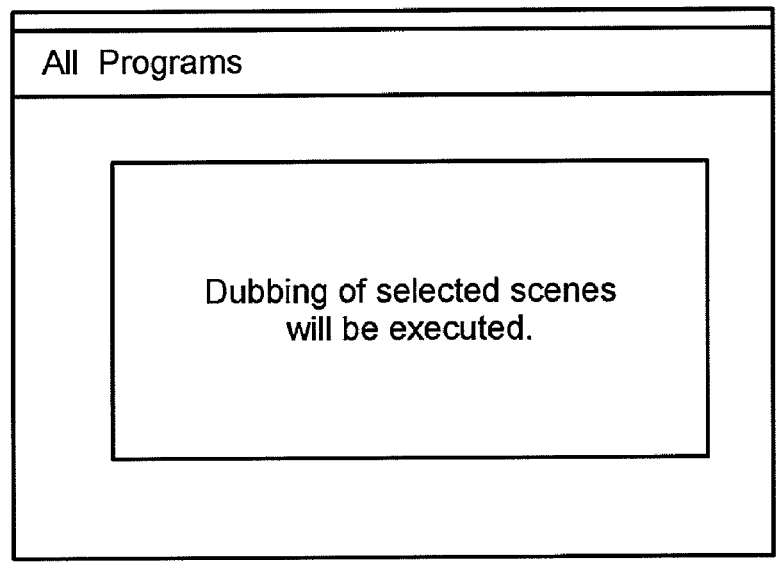
FIG. 20B is a representation of an example screen display after the operation of the dubbing button.

FIGS. 20A and 20B show an example in which direct dubbing is executed for only a scene selected from a navigation screen on the LCD 7 displaying a plurality of scenes respectively represented by thumbnail images.

More specifically, in the example, FIG. 20A is the navigation screen displaying the plurality of scenes respectively represented by the thumbnail images. The navigation screen includes thumbnail images 121 respectively representing the scenes, a cursor 122 placed on one of the thumbnail images 121, a selected thumbnail image 123, and a title bar 124 for identifying the navigation screen. In the state where a plurality of scenes, when the user depresses the dubbing button 11, the message "Dubbing of selected scenes will be executed.", which is easily understandable to the user, is displayed, as shown in FIG. 20B. Thereby, a dubbing guide (screen) such as shown in the first embodiment is not displayed, but the direct dubbing is started in an alternative manner.

As described above, according to the respective example embodiments, the video camera can be provided that concurrently enables easy operation of the various dubbing functions and verification of dubbing information for dubbing in the main body of the video camera containing the hard disk drive and the optical disk drive and, in addition, that is excellent in ease of use or usability. Especially, according to the video camera, since being corresponding to the display (all-programs/program/play list) before operation of the dubbing button, the scene-dubbing selection range is easily understandable to the user, and the range is explained by being displayed on the dubbing guide screen. This makes it possible to even more effectively prevent erroneous operation with respect to the selection range.

In the respective embodiment described above, while the imaging device is the CCD, it may instead be a CMOS (complementary metal oxide semiconductor) sensor or the like.

Further, in the respective embodiment described above, a video image is the LCD, but may be a display other than the LCD, such as EVF (electric view finder) or ELD (electro-luminescence display).

Further, in the respective embodiment described above, only dubbing from the HDD to the DVD is described, but dubbing between other mediums may be executed.

Further, in the respective embodiment described above, while the explanatory text in the screen field below the dubbing guide is displayed to be variable corresponding to the program/play list displayed immediately before entrance into the dubbing mode, a title bar may be used instead of the explanatory text.

At least a portion (if not all) of the present invention may be practiced as a software invention, implemented in the form of one or more machine-readable medium having stored thereon at least one sequence of instructions that, when executed, causes a machine to effect operations with respect to the invention. With respect to the term "machine", such term should be construed broadly as encompassing all types of machines, e.g., a non-exhaustive listing including: computing machines, non-computing machines, communication machines, cell phones, etc. With regard to the term "one or more machine-readable medium", the sequence of instructions may be embodied on and provided from a single medium, or alternatively, differing ones or portions of the instructions may be embodied on and provided from differing and/or distributed mediums. A "machine-readable medium" includes any mechanism that provides (i.e., stores and/or transmits) information in a form readable by a machine (e.g., a processor, computer, electronic device). Such "machine-readable medium" term should be broadly interpreted as encompassing a broad spectrum of mediums, e.g., a non-exhaustive listing including: electronic medium (read-only memories (ROM), random access memories (RAM), flash cards); magnetic medium (floppy disks, hard disks, magnetic tape, etc.); optical medium (CD-ROMs, DVD-ROMs, etc); electrical, optical, acoustical or other form of propagated signals (e.g., carrier waves, infrared signals, digital signals); etc., as existing on a tangible carrier.

Method embodiments may be emulated as apparatus embodiments (e.g., as a physical apparatus constructed in a manner effecting the method); apparatus embodiments may be emulated as method embodiments. Still further, embodiments within a scope of the present invention include simplistic level embodiments through system levels embodiments.

In beginning to conclude, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or component, it is submitted that it is within the purview of one skilled in the art to effect such feature, structure, or characteristic in connection with other ones of the embodiments and/or components. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc. Further, unless indicated otherwise, any of the specific procedures may be effected in real-time during operation of any apparatus and/or method.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. An information recording and/or playback apparatus for dubbing all or some video image scenes onto a second recording medium from a first recording medium in which a plurality of programs each including a plurality of video image scenes and a plurality of play lists each including an arbitrary combination of a plurality of video image scenes contained in all the programs are recorded, the apparatus comprising:
    a display module which displays a first display screen that displays video image scenes contained in the all the programs, a second display screen that displays video image scenes contained in one program, and a third display screen that displays video image scenes contained in one play list;
    a dubbing instruction module which issues an instruction for entrance into a dubbing mode; and
    a control module which provides control so that, upon entrance into the dubbing mode, identifiers for selection of one of a plurality of dubbing functions respectively having different dubbing video image scene selection methods and a dubbing guide screen for displaying an explanation regarding the respective dubbing function are displayed and so that, when the dubbing instruction module is operated during display of any one of the first to third display screens, the explanation regarding the respective dubbing function is changed depending upon which one of the first to third display screens was displayed before operation of the dubbing instruction, the video image scenes recorded in the first recording medium each include dubbed/un-dubbed state information, the un-dubbed state corresponding to a state in which data has not yet been dubbed onto a second medium; and one of the plurality of dubbing functions is a function that executes dubbing of only an un-dubbed video image scene(s) in accordance with the dubbed/un-dubbed state information, and that executes dubbing of an un-dubbed video image scene(s) from the all programs when the first display screen was displayed before operation of the dubbing instruction module, that executes dubbing of an un-dubbed video image scene(s) from a program being displayed when the second display screen was displayed before operation of the dubbing instruction module, and that executes dubbing of an un-dubbed video image scene(s) from a play list being displayed when the third display screen was displayed before operation of the dubbing instruction module.

2. An information recording and/or playback apparatus according to claim 1, wherein:

the video image scenes recorded in the first recording medium each include information indicative of a date; and one of the plurality of dubbing functions is a function that executes dubbing by separating video image scenes in units of the date, and that executes dubbing of a video image scene(s) of a date selected from the all programs when the first display screen was displayed before operation of the dubbing instruction module, that executes dubbing of a video image scene(s) of a date selected from a program being displayed when the second display screen was displayed before operation of the dubbing instruction module, and that executes dubbing of a video image scene(s) of a date selected from a play list being displayed when the third display screen was displayed before operation of the dubbing instruction module.

3. An information recording and/or playback apparatus according to claim 1, wherein a recording medium mounted as the first recording medium is a hard disk drive, and the second recording medium is an optical disk in the form of a digital versatile disk (DVD).

4. An information recording and/or playback apparatus for dubbing all or some video image scenes onto a second recording medium from a first recording medium in which a plurality of video image scenes are recorded, the apparatus comprising:

a display module which displays a first display screen that displays video image scenes contained in the all programs, a second display screen that displays video image scenes contained in one program, and a third display screen that displays video image scenes contained in one play list;

a dubbing module including a plurality of dubbing functions respectively having different video image scene selection methods; and a control module which provides control so that, in the event of executing dubbing, identifiers for selection of one of the plurality of dubbing functions and a dubbing guide screen for displaying an explanation regarding the respective dubbing function are displayed and so that, in the event that one of the plurality of dubbing functions for allowing a user to select a dubbing video image scene is selected, when a video image scene is not selected before the dubbing guide screen is displayed, a video image scene to be dubbed is selected by the user from a state where the dubbing video image scene is not selected, or alternatively, when a video image scene is selected before the dubbing guide screen is displayed, a video image scene to be dubbed is selected by the user from a state where the selected video image scene is preliminarily selected as the dubbing video image scene, the video image scenes recorded in the first recording medium each include dubbed/un-dubbed state information, the un-dubbed state corresponding to a state in which data has not yet been dubbed onto a second medium; and one of the plurality of dubbing functions is a function that executes dubbing of only an un-dubbed video image scene(s) in accordance with the dubbed/un-dubbed state information.

5. An information recording and/or playback apparatus according to claim 4, wherein:

the video image scenes recorded in the first recording medium each include information indicative of a date; and one of the plurality of dubbing functions is a function that executes dubbing by separating video image scenes in units of the date.

6. An information recording and/or playback apparatus according to claim 4, wherein a recording medium mounted as the first recording medium is a hard disk drive, and the second recording medium is an optical disk in the form of a digital versatile disk (DVD).

\* \* \* \* \*